US008820493B2

(12) United States Patent
Parida et al.

(10) Patent No.: US 8,820,493 B2
(45) Date of Patent: Sep. 2, 2014

(54) SHOCK ENERGY ABSORBER (75) Inventors: Basant K. Parida, Bellingham, MA (US); Timothy Harrigan, Franklin, MA (US); James Carter, Bedford, MA (US); Norman Dana, Albion, RI (US); Gopal Samavedam, Sudbury, MA (US)

(73) Assignee: Foster-Miller, Inc., Waltham, MA (US)

( * ) Notice: Subject to any disclaimer, the term of this patent is extended or adjusted under 35 U.S.C. 154(b) by 137 days.

(21) Appl. No.: 12/925,354

(22) Filed: Oct. 19, 2010

(65) Prior Publication Data

US 2011/0114427 A1 May 19, 2011

Related U.S. Application Data (60) Provisional application No. 61/281,314, filed on Nov. 16, 2009.

(51) Int. Cl.
*F16F 9/30* (2006.01)
*B61G 11/12* (2006.01)

(52) U.S. Cl.
CPC .. *B61G 11/12* (2013.01); *F16F 9/30* (2013.01)
USPC ........... 188/268; 188/374; 213/220; 267/138; 267/139

(58) Field of Classification Search
CPC .......... F16F 7/003; F16F 7/125; F16F 9/303; B61G 11/16
USPC .............. 188/268, 266, 371, 372, 374; 213/7, 213/40 R, 43, 220–223; 267/138–139
See application file for complete search history.

(56) References Cited

U.S. PATENT DOCUMENTS

| 2,997,325 | A | * | 8/1961 | Peterson | 293/133 |
| 3,006,484 | A | | 10/1961 | Pringiers | |
| 3,053,526 | A | * | 9/1962 | Kendall | 267/134 |
| 3,139,290 | A | * | 6/1964 | Swick | 280/481 |
| 3,209,864 | A | | 10/1965 | Boyd | |
| 3,365,189 | A | * | 1/1968 | Carlson | 267/152 |

(Continued)

FOREIGN PATENT DOCUMENTS

| DE | 10 2009 029 814 B4 | 1/2011 |
| JP | 60252832 A * | 12/1985 |
| JP | 2007231241 | 9/2007 |

OTHER PUBLICATIONS

Jauffres et al., "Microstructural origin of physical and mechanical properties of ultra high molecular weight polyethylene processed by high velocity compaction". Aug. 1, 2007. Elsevier Ltd. Polymer 48 (2007) 6374-6383.*

(Continued)

*Primary Examiner* — Anna Momper
(74) *Attorney, Agent, or Firm* — Iandiorio Teska & Coleman, LLP (57) ABSTRACT A shock energy absorber includes, in one example, a cylinder having a closed end and an open end, a sleeve fixed about the open end of the cylinder, and a damping material in the form of an ultra high molecular weight polyethylene material in the cylinder. A plunger is positioned to be driven into the damping material via the sleeve. When the plunger is impacted and driven into the damping material, the damping material changes from a solid to a viscous fluid state thereby enabling absorption of a significant amount of energy.

24 Claims, 10 Drawing Sheets

(56) References Cited

U.S. PATENT DOCUMENTS

| | | | |
|---|---|---|---|
| 3,713,641 A * | 1/1973 | Kendall | 267/139 |
| 3,741,560 A | 6/1973 | Schaller | |
| 3,747,915 A | 7/1973 | Hall | |
| 3,773,187 A | 11/1973 | Carlson | |
| 3,847,252 A | 11/1974 | Casciola | |
| 3,876,044 A * | 4/1975 | Kendall et al. | 188/282.8 |
| 3,913,707 A | 10/1975 | Wastenson et al. | |
| 4,040,523 A * | 8/1977 | Carle et al. | 213/46 R |
| 4,403,012 A | 9/1983 | Harpell et al. | |
| 4,778,633 A | 10/1988 | Kiang et al. | |
| 5,349,893 A | 9/1994 | Dunn | |
| 5,354,605 A | 10/1994 | Lin et al. | |
| 5,875,875 A | 3/1999 | Knotts | |
| 6,050,211 A * | 4/2000 | Yamaguchi | 114/219 |
| 6,135,252 A | 10/2000 | Knotts | |
| 6,393,999 B1 | 5/2002 | Schneider | |
| 6,477,934 B1 | 11/2002 | Bruhn et al. | |
| 6,532,857 B1 | 3/2003 | Shih et al. | |
| 7,255,034 B2 | 8/2007 | Strassgurtl et al. | |
| 7,735,427 B2 | 6/2010 | Gansweidt | |
| 7,806,038 B2 | 10/2010 | Duke | |
| 7,845,266 B2 | 12/2010 | Duke et al. | |
| 7,908,959 B2 | 3/2011 | Pavon | |
| 7,987,762 B2 | 8/2011 | Joynt et al. | |
| 7,997,181 B1 | 8/2011 | Tunis et al. | |
| 7,997,182 B1 | 8/2011 | Cox | |
| 8,033,208 B2 | 10/2011 | Joynt et al. | |
| 8,146,477 B2 | 4/2012 | Joynt | |
| 2004/0206591 A1 | 10/2004 | Smelser | |
| 2006/0013977 A1 | 1/2006 | Duke et al. | |
| 2007/0144337 A1 | 6/2007 | Zhang et al. | |
| 2008/0111396 A1 | 5/2008 | Barbe et al. | |
| 2009/0065462 A1 | 3/2009 | Gansweidt | |
| 2010/0173117 A1 | 7/2010 | Duke et al. | |
| 2010/0307327 A1 | 12/2010 | Gettle | |
| 2010/0307329 A1 | 12/2010 | Kaswen et al. | |
| 2011/0114427 A1 | 5/2011 | Parida et al. | |
| 2011/0148147 A1 | 6/2011 | Tunis et al. | |
| 2011/0169240 A1 | 7/2011 | Schreiner et al. | |
| 2011/0259185 A1 | 10/2011 | Berning et al. | |
| 2012/0055324 A1 | 3/2012 | Pepka | |
| 2012/0152098 A1 | 6/2012 | Howland et al. | |
| 2012/0186436 A1 | 7/2012 | Parida et al. | |
| 2012/0204711 A1 | 8/2012 | Engleman et al. | |
| 2013/0152774 A1 | 6/2013 | Gonzalez | |
| 2013/0319215 A1 | 12/2013 | Parida et al. | |

OTHER PUBLICATIONS

Written Opinion of the International Searching Authority, International Application No. PCT/US2010/002793, mailed Dec. 30, 2010 (five (5) pages).
U.S. Appl. No. 13/507,051, filed May 31, 2012, Parida et al.
U.S. Appl. No. 13/604,019, filed Sep. 5, 2012, Parida et al.
U.S. Appl. No. 13/604,248, filed Sep. 5, 2012, Parida et al.
U.S. Appl. NO. 13/604,288, filed Sep. 5, 2012, Parida et al.
Written Opinion of the International Searching Authority for PCT Application No. PCT/US2012/058420 mailed Jul. 1, 2013 (five (5) pages).
Written Opinion of the International Searching Authority for PCT Application No. PCT/US2013/57816 mailed Nov. 15, 2013 (nine (9) pages).

* cited by examiner

SHOCK ENERGY ABSORBER

RELATED APPLICATIONS

This application hereby claims the benefit of and priority to U.S. Provisional Application Ser. No. 61/281,314 filed on Nov. 16, 2009 under 35 U.S.C. §§119, 120, 363, 365, and 37 C.F.R. §1.55 and §1.78.

GOVERNMENT RIGHTS

This invention was made with U.S. Government support under Contract No. DTFR53-07-D-00003-TO7 awarded by the Federal Railroad Administration. The Government has certain rights in the invention.

FIELD OF THE INVENTION

The subject invention relates to energy absorption.

BACKGROUND OF THE INVENTION

Generally, shock absorbers are oleo type or oleo-pneumatic type in which the oil is forced to pass through a plurality of orifices within a cylinder-piston arrangement under increasing pressure caused by the impacting force and thereby damping out the relative motion between the cylinder and piston as well as attenuating the transmitted force magnitude. Alternative shock absorbers may use a thin-walled hollow cylinder which crumples and absorbs energy under impact condition. The physical dimensions of such shock absorbers greatly increase in proportion to the magnitude of the impacting force and/or the kinetic energy to be absorbed. For use in crash energy management system related to vehicular crashworthiness and occupant safety, very little space may be available to accommodate these conventional shock absorbers.

BRIEF SUMMARY OF THE INVENTION

This disclosure provides a new concept for a compact shock energy absorber system which can be effectively used for shock mitigation. On the basis of a series of laboratory tests and a prototype test performed by the inventors, it is concluded that a significant amount of energy can be absorbed in an impact or crash event by the present invention. Additionally, this class of shock absorption system can be scaled up or down and optimized to meet a wide range of impact energy management scenarios that can be achieved at much lower cost and very little or no maintenance effort, compared to alternative energy absorption systems.

The shock energy absorber system described herein can be optimized to limit the magnitude of peak dynamic force by proper tailoring of geometric dimensions and by efficiently absorbing the available kinetic energy of the impacting body within very limited space. This shock energy absorber can potentially mitigate or minimize the severity of damage to property and injury to occupants in a vehicular crash or impact event.

Examples of the invention provide a new type of shock absorber system that utilizes a novel design and a unique elastic-plastic deformation behavior of Ultra High Molecular Weight (UHMW) Polyethylene or similar materials within a confined space when subjected to compressive impact force. It permits rapid absorption of kinetic energy and limits the impacting force magnitude through the energy absorption process. Examples include an innovative use of a solid state damping material that is available in various grades as Ultra High Molecular Weight Poly-Ethylene (UHMW-PE).

Traditionally, Ultra High Molecular Weight Poly-Ethylene (UHMW-PE) and High Density Poly-Ethylene (HDPE) materials have been extensively used in applications where low friction coefficient and high wear resistance are of paramount importance. In some instances, UHMW-PE extruded sections and beams have also been used as buffers such as in water transportation system docks and locks because of their high flexural stiffness against lateral impact. Polymeric ballistic material comprising a high molecular weight, high density polyethylene (HMW-HDPE) and articles made from this ballistic material have been found suitable for stopping ballistic projectiles. See also U.S. Patent Application Publication No. 2006/0013977 incorporated herein by this reference.

The inventors have explored and innovatively used cylindrical UHMW-PE bars confined within a metallic cylinder (e.g., steel) for absorption of kinetic energy of an impacting plunger with a conical front. This is intended to be used with appropriate scaling and optimized configuration as a part of proposed Crash Energy Management (CEM) system for locomotive crashworthiness applications. Other potential applications may include other land vehicles.

Preliminary investigation including quasi-static testing of UHMW-PE cylindrical bar in a compression test machine offered promising results and insight into existence of two distinctly different regimes of deformation behavior under compression loading. Computation of energy absorption from force versus displacement curves of quasi-static tests exhibited potential for its application as a crash energy absorber, provided its high strain rate response behavior under high speed impact condition is equally promising. In order to evaluate this, a "Pendulum Impact Test" was also performed and the test data generated at an impact velocity of about 17 feet per second supported the concept of effective high energy shock absorption with very little axial deformation of the UHMW-PE material. Additional testing was also conducted.

A shock energy absorber in accordance with an example of the invention includes a vessel and a damping material in the vessel in a solid state and which transitions from a solid to a viscous fluid state when stressed by a plunger. The plunger is positioned to be driven into the damping material to absorb energy.

The vessel typically includes a cylinder having a closed end and open end. There may be a flange at the closed end of the cylinder for mounting the cylinder. Also included may be a sleeve fixed about the open end of the cylinder surrounding the plunger. The sleeve may include a bearing about the plunger. Preferably, the plunger has a conical end abutting the damping material. In some examples, the damping material includes a seat receiving the conical end of the plunger therein.

Preferably, the damping material is an ultra high molecular weight polyethylene material. The damping material may radially fill the cylinder. In one example, the plunger includes a hollow portion.

The invention also features a method of manufacturing a shock energy absorber. The method typically comprises filing a vessel with a damping material in a solid state. The damping material is configured to transition from a solid to a viscous fluid state when stressed. A plunger is positioned to be driven into the damping material upon the application of a force to the plunger.

The vessel may be fabricated to include a cylinder having a closed end and open end. A flange can be added at the closed end of the cylinder for mounting the cylinder. The method may further including fitting a sleeve about the open end of the cylinder and about the plunger and adding a bearing about the plunger. The method may also include fabricating a conical end on the plunger abutting the damping material and forming a seat in the damping material receiving the conical end of the plunger therein.

The invention also includes filling a vessel with a damping material in a solid state, the damping material transitioning from a solid to a viscous fluid when stressed, positioning a plunger to be driven into the damping material, fixing the vessel or the plunger to a structure, and driving the plunger into the damping material by moving the structure to strike an object or by moving an object to strike the structure whereupon the damping material changes from a solid state to a viscous fluid state.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
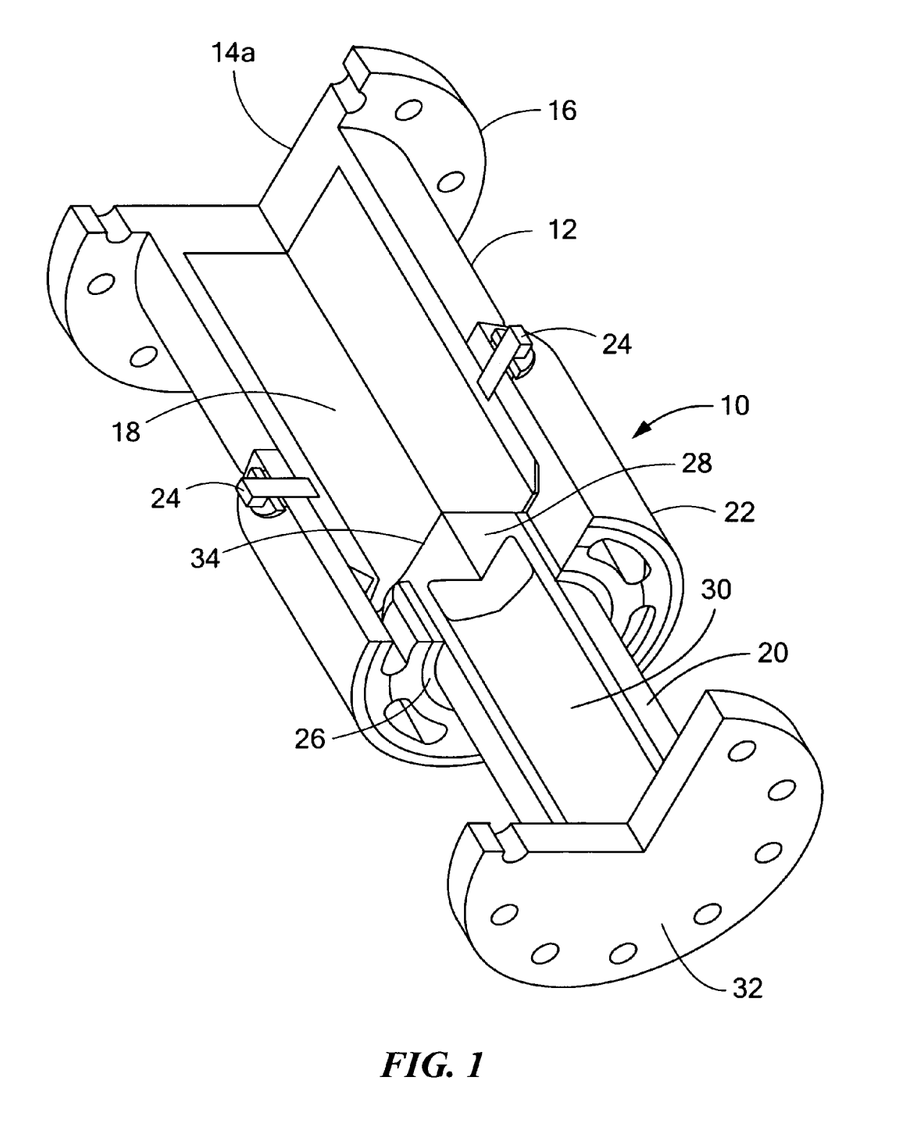
FIG. 1 is a schematic front cut away view showing an energy absorber in accordance with an example of the subject invention.
Figure 2:
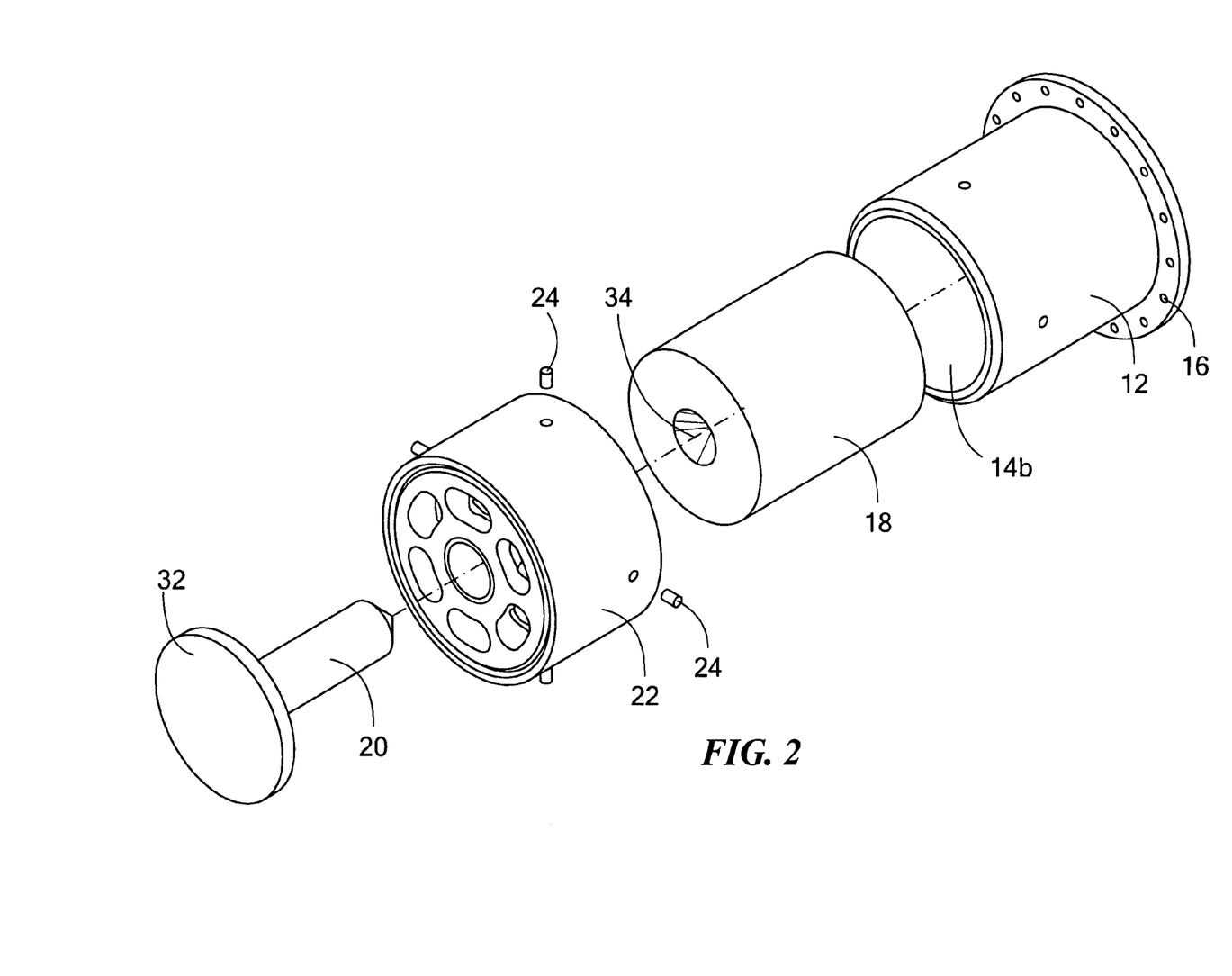
FIG. 2 is a schematic three-dimensional exploded view of the energy absorber shown in FIG. 1.

A novel compact high energy shock absorber can preferably be made of very few machined parts. The major components in one example are shown in FIGS. 1-2. Shock energy absorber 10 includes vessel 12, in this particular example, a cylinder with closed end 14a and open end 14b. In this example, flange 16 is included at closed end 14a for mounting cylinder 12 to a structure such as a locomotive or other vehicle or the bottom of an elevator shaft or the like.

Damping material 18 (e.g., UHMW-PE material) in its solid state is placed in and confined within cylinder 12. Typically, the damping material radially fills the cylinder for most of the length of the cylinder. Plunger 20 is positioned to be driven into damping material 18. In this particular example, sleeve 22 is provided and fixed about the open end of cylinder 12 via fasteners 24. Sleeve 22 includes bearing 26 about plunger 20. Plunger 20 in this example includes conical end 28, hollow shaft portion 30 (for weight reduction), and flange portion 32. Damping material 18 may include seat 34 receiving conical end 28 of plunger 20.

The cylinder is preferably made of high strength alloy steel and of seamless construction with a larger wall thickness to safely withstand a high magnitude of hoop stress. The UHMW-PE cylindrical specimen is made to snug-fit with the inner diameter of the cylinder. At the center of the UHMW-PE specimen, a small diameter through hole can be included to guide the vertex of the conical-front plunger during impact. The plunger is also made of high strength alloy steel and its dimensions are selected to leave adequate clearance between the inner diameter of cylinder and the outer diameter of the plunger. The plunger may be made of a solid steel bar or a hollow steel bar of large wall thickness. Its length should be adequate to achieve the maximum stroke or travel desired under the action of the impact force. The steel sleeve fitted with a bearing is intended to offer lateral support and guide the plunger to travel coaxially along the centerline of the UHMW-PE material upon impact. The sleeve is screwed down to the outer surface of the cylinder for adequate support and proper alignment of the axis of plunger with that of the UHMW-PE cylinder. The cylinder and the plunger can both provided with circular flanges at their bases which have provision for attachment to corresponding mating surfaces or plates with a number of fasteners. If necessary, the rear (striking) end of the plunger may be left unattached to any surface depending on the configuration of the vehicle or structure or when the plunger is required to contact directly with an impacting body.

In a typical application, the geometric dimensions of the shock energy absorber will be tailored to limit the desired highest impact force magnitude, depending on the strength of the reaction surface to which the cylinder block is mounted, and the maximum travel of the plunger commensurate with the required kinetic energy absorption. The components of the system are mounted to the required position while ensuring their proper alignment.

When the impacting body or object strikes the rear end (32, FIGS. 1-2) of the plunger with adequate momentum, its conical front-end presses hard against the UHMW-PE cylinder and penetrates it, which, in turn, offers a reaction force to decelerate the motion of the plunger. With the plunger continuing to press on against the UHMW-PE, when a critical stress magnitude is reached, the UHMW material undergoes a phase transition from solid to a viscous fluid state. This phase transition occurs within a confined space and at or above a critical compressive flow stress magnitude based on the plunger area of cross-section. In one laboratory test, it has been observed to be a reversible process in that upon releasing the high stress magnitude, the viscous UHMW-PE material regains its solid state. Upon impact, the plunger with the conical front penetrates into the front end of the UHMW-PE cylinder. With the increasing impact force magnitude, the UHMW-PE material undergoes phase transition at or above the critical flow stress. As the UHMW-PE material ahead of the plunger transitions into viscous fluid state, the resisting force on plunger drops sharply to a lower value. The plunger would then continue to move with a gradual further rise in force magnitude until the end of the plunger's travel is reached or until the impact energy is absorbed. The maximum impact force experienced by the structure supporting the cylinder may be slightly more than that developed by the plunger corresponding to the critical stress of the UHMW-PE material used. Total energy absorbed by the shock energy absorber during the impact would be nearly equal to the work done by the plunger on the UHMW-PE cylinder.

This shock energy absorption system embodies a new concept and is presently not known to be used by any industry. The compact system requires less space to accommodate it and less travel distance of the plunger to absorb a high amount of impact energy. It offers scope for dimensional optimization to limit the desired peak impact force magnitude. It utilizes a low cost, UV-resistant solid UHMW-PE or similar material for shock absorption. In real life applications, an installed unit requires very little or no maintenance over long time period without any risk of leaking hydraulic fluid as in some alternative shock absorption systems.

The inventors performed a compression test using an INSTRON Model 8502 servo-hydraulic test machine. The test specimen was a 2.5 in diameter UHMW-PE solid bar inserted inside a seamless steel cylinder that was mounted over the actuator of INSTRON test machine. The initial plunger was a conical front 2.0 in diameter steel plunger, which failed to penetrate the UHMW-PE specimen even at safe machine load capacity of 50 kilo-pound (kip), although it made a dimpled impression on the specimen surface. The inventors replaced the conical front plunger with a fully threaded 1.0 in diameter and 3.0 in long flat-ended steel bar that was readily available and performed the compression test on the same test specimen. During the test, it was noted that initially the compression force gradually increased with threaded bar displacement into the UHMW-PE cylinder up to about 1.0 inch when the force magnitude was approximately 20 kip. Beyond that point the force magnitude almost remained constant with increasing displacement of the threaded bar. The test was stopped at a maximum displacement of about 1.7 inches and the test specimen was unloaded. Later, the inventors tried unsuccessfully to remove the threaded bar from the UHMW-PE specimen. The UHMW-PE cylinder was then cut open along a diametric plane on its back face to remove the threaded bar. After cutting the UHMW-PE cylinder into two halves, the threaded bar popped out of the groove revealing thread impressions inside the groove in both halves of the UHMW-PE cylinder.

Figure 3:
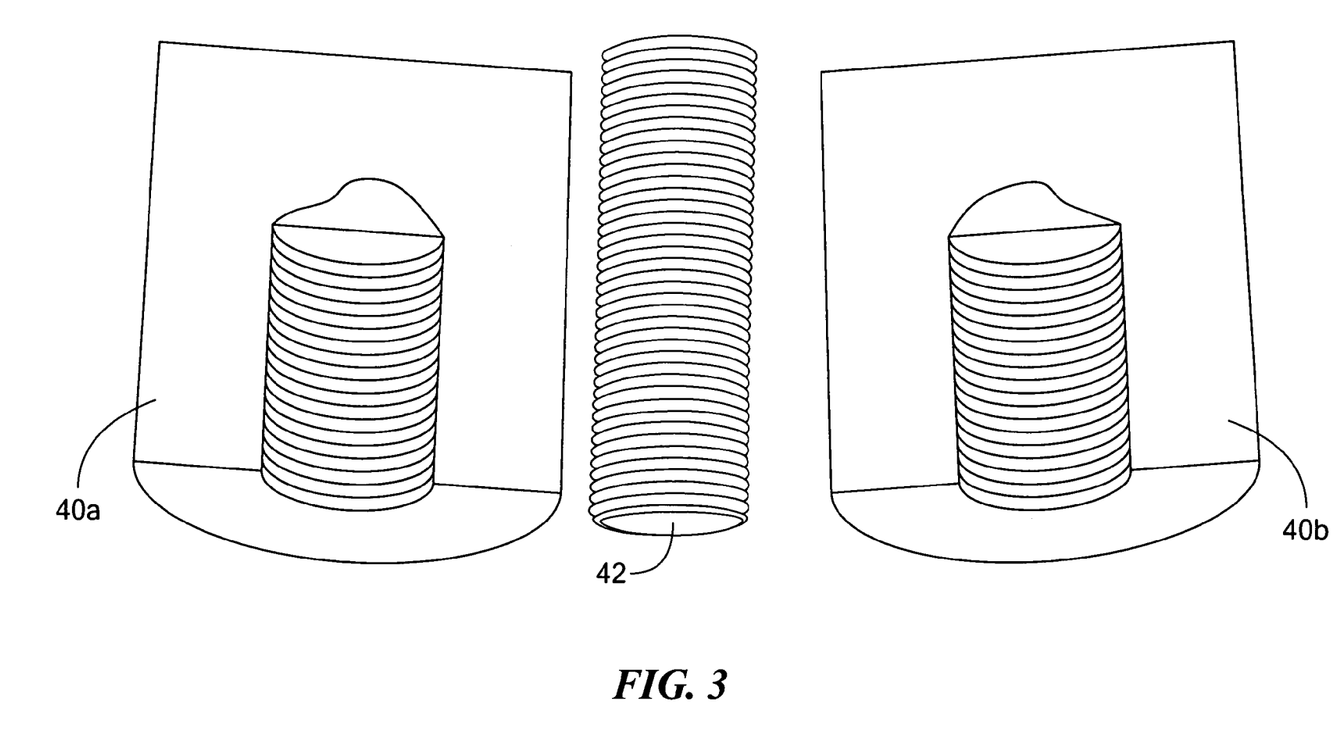
FIG. 3 is a depiction of two halves of a UHMW-PE cylinder tested with a flat-ended threaded steel bar.

FIG. 3 shows the two halves 40a and 40b of the UHMW-PE cylinder, including the thread impressions inside the grooves and the flat-ended threaded steel bar 42 used in the above test.

From FIG. 3 it is seen that there are solidified UHMW-PE material deposit in the shape of raised triangular mass just ahead of the end-position of the flat-ended steel bar. This raised triangular UHMW-PE material is seen in both halves of the cut-cylinder, which shows clear evidence of later local oozing out, solidification, and increase in volume of viscous-state UHMW-PE material after the cylinder was cut open. The thread impressions in both halves are also suggestive of a softer viscous state of the core material adjacent to the threaded steel bar that was "locked-in-place" and that solidified following the removal of load in the test machine.

Figure 4:
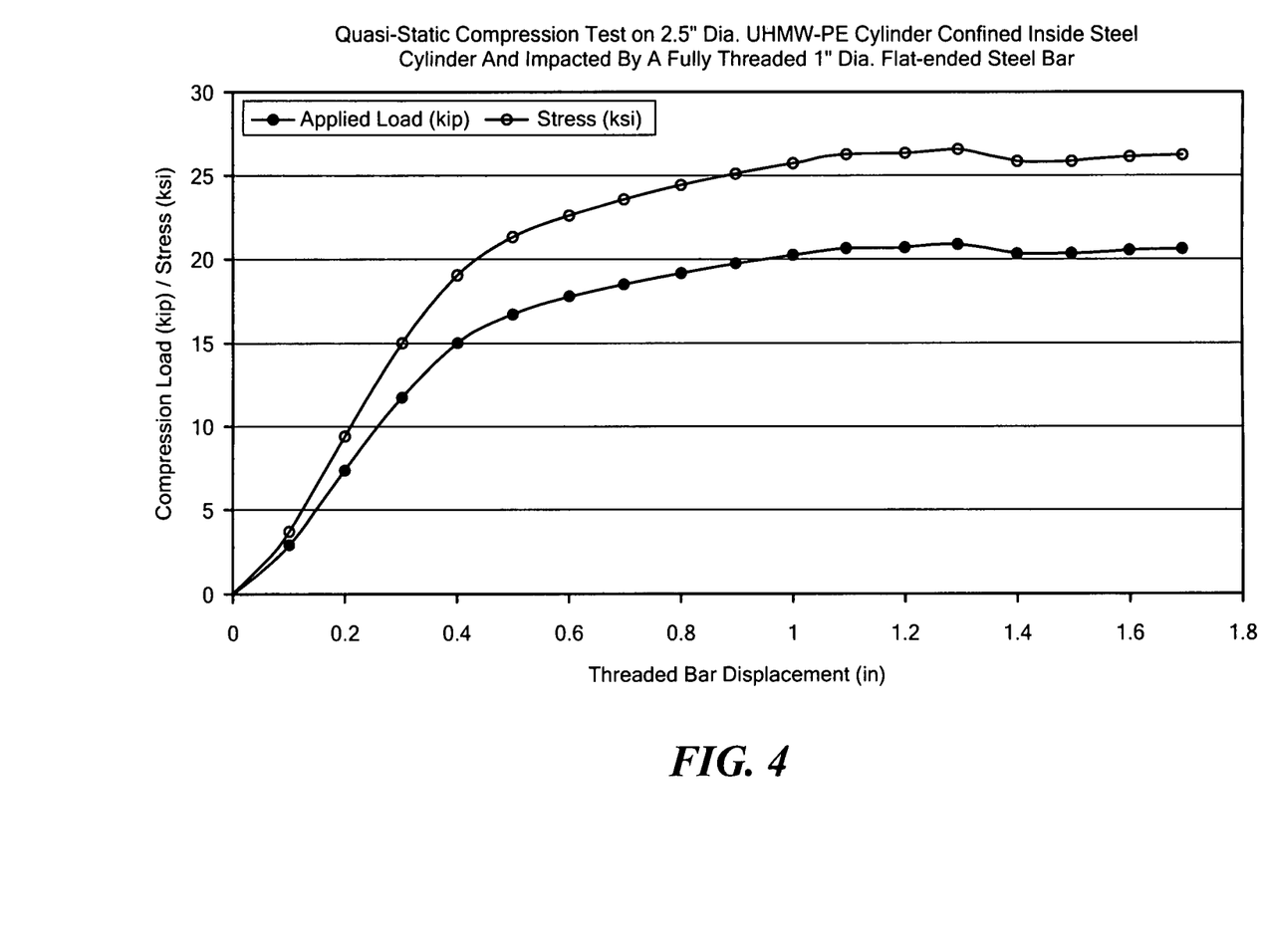
FIG. 4 is a graph showing compression load and stress variation with bar displacement for the test device shown in FIG. 3.

FIG. 4 shows graphical representation of the above test results plotted as compression load and compression stress versus the displacement of the threaded bar into the UHMW-PE cylinder. These graphs show that beyond approximately 20 kip load or about 25 ksi stress, the core UHMW-PE material did not offer further increasing resistance and the subsequent displacement of the threaded bar took place at almost the same compressive load/stress level, associated with the phase transition of the highly stressed UHMW-PE core material. The compression stress magnitude mentioned here is based on the cross-sectional area of the plunger.

Figure 5:
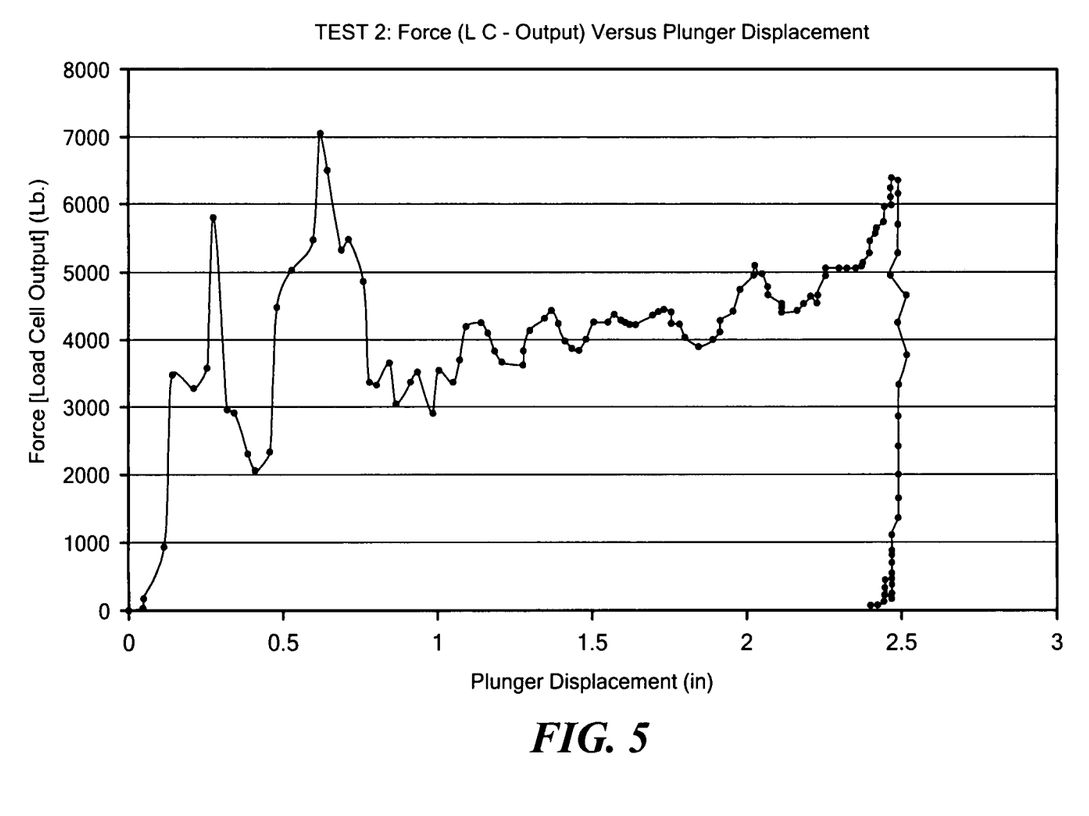
FIG. 5 is a graph showing the variation of instantaneous compression force with plunger displacement for a pendulum impact test unit during impact at 17.14 feet per second.

FIG. 5 shows a graphical representation of the dynamic force versus plunger displacement obtained from a typical impact test conducted at 17.14 feet per second impact velocity.

A prototype unit similar to FIGS. 1-2 was also fabricated and tested. The diameter of damping material 18 was 9.5" and the plunger 30 had a diameter of 3".

Figure 6A:
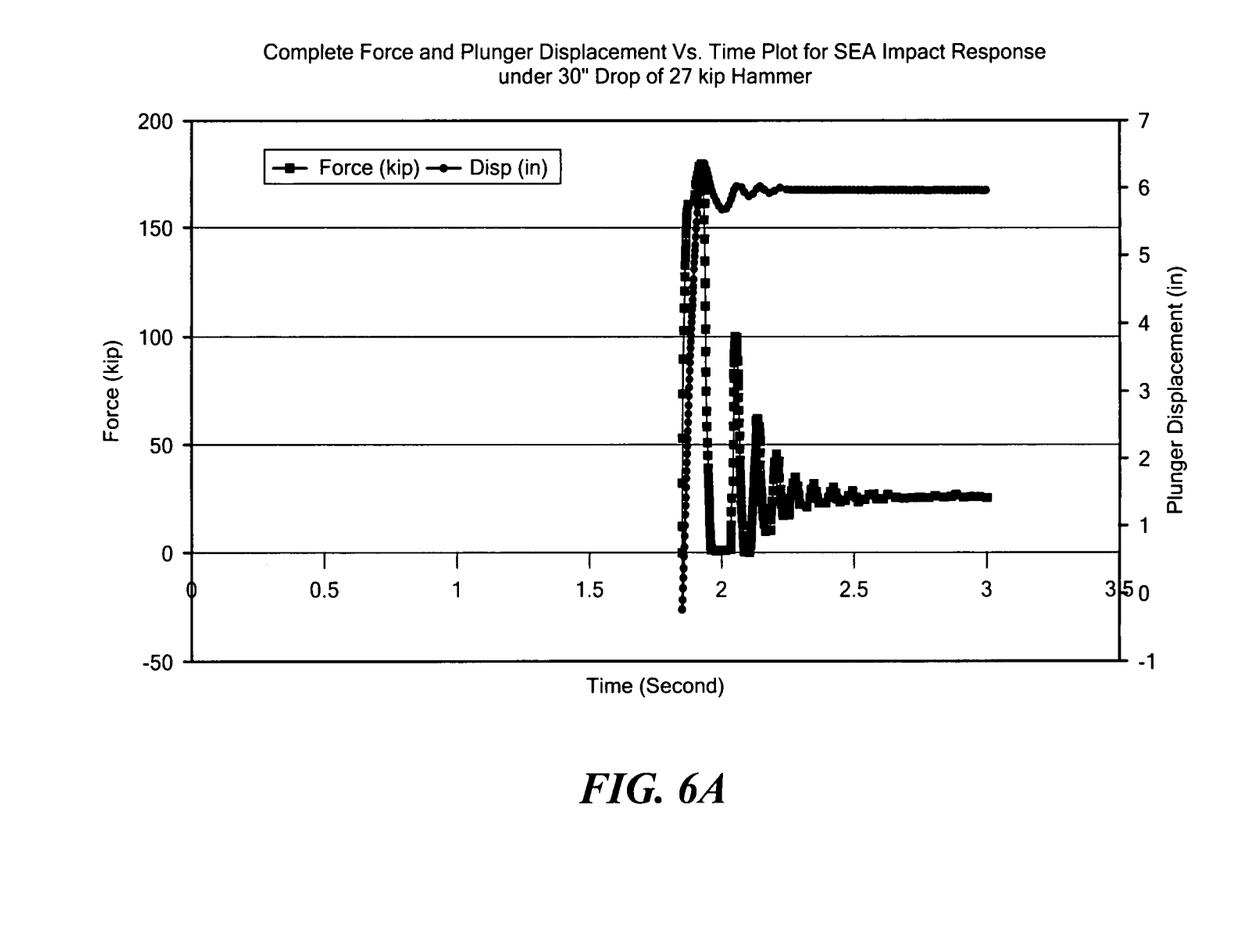
FIG. 6A is a force and plunger displacement graph versus time for a 30" drop of a 27 kip hammer in a test using a prototype shock energy absorber as shown in FIGS. 1 and 2.
Figure 6B:
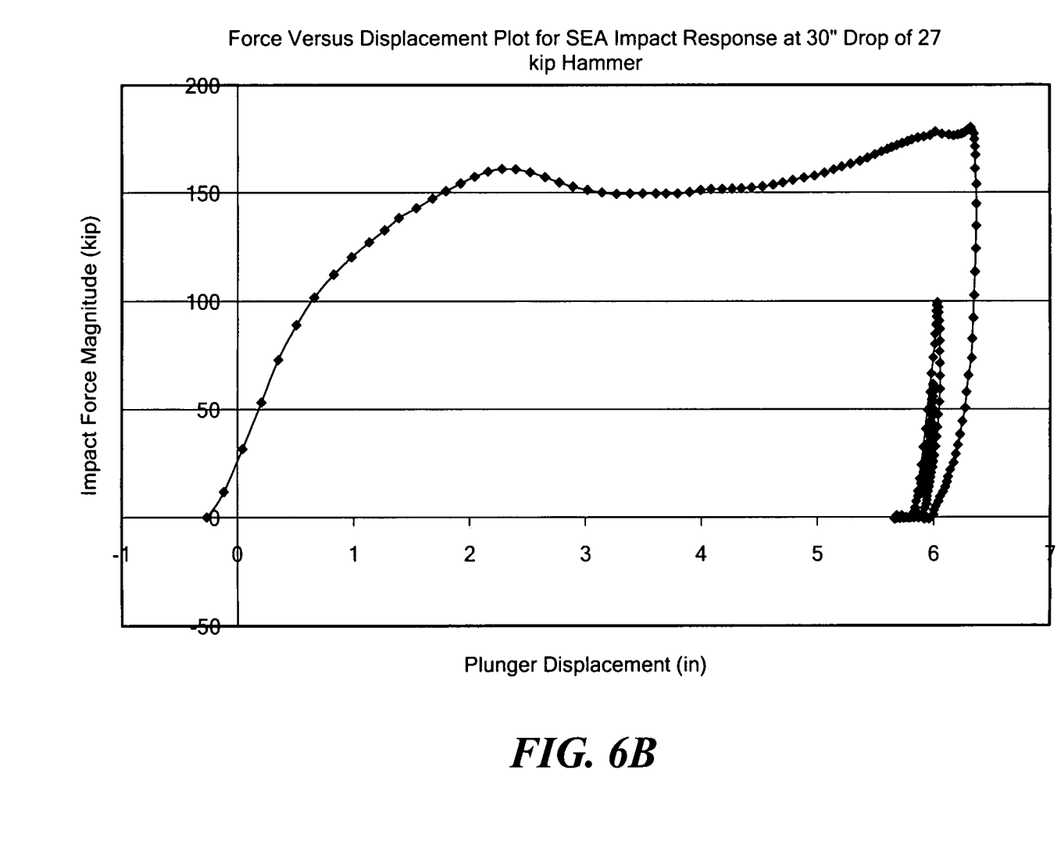
FIG. 6B is a graph showing plunger displacement as a function of impact force magnitude for the prototype shock energy absorber of FIGS. 1 and 2.

FIG. 6A shows force and plunger displacement as a function of time for 30" drop of a 27 kip hammer testing device impacting flange end 32 of plunger 20. A reversible phase transition of the damping material was clearly observed. The peak force was approximately 180 kips and the kinetic energy absorbed was approximately 82,260 ft-lb. As shown in FIG. 6B the phase transition of the UHMW-PE material occurred at approximately 2 inches of plunger displacement. By scaling the shock energy absorber, it is possible to tailor the peak crash energy absorption up to any desired value. The cylinder serves as a compression vessel for the UHMW-PE material. Important design criteria include the impact velocity, the cross-sectional area of the damping material, and the plunger diameter.

Figure 7:
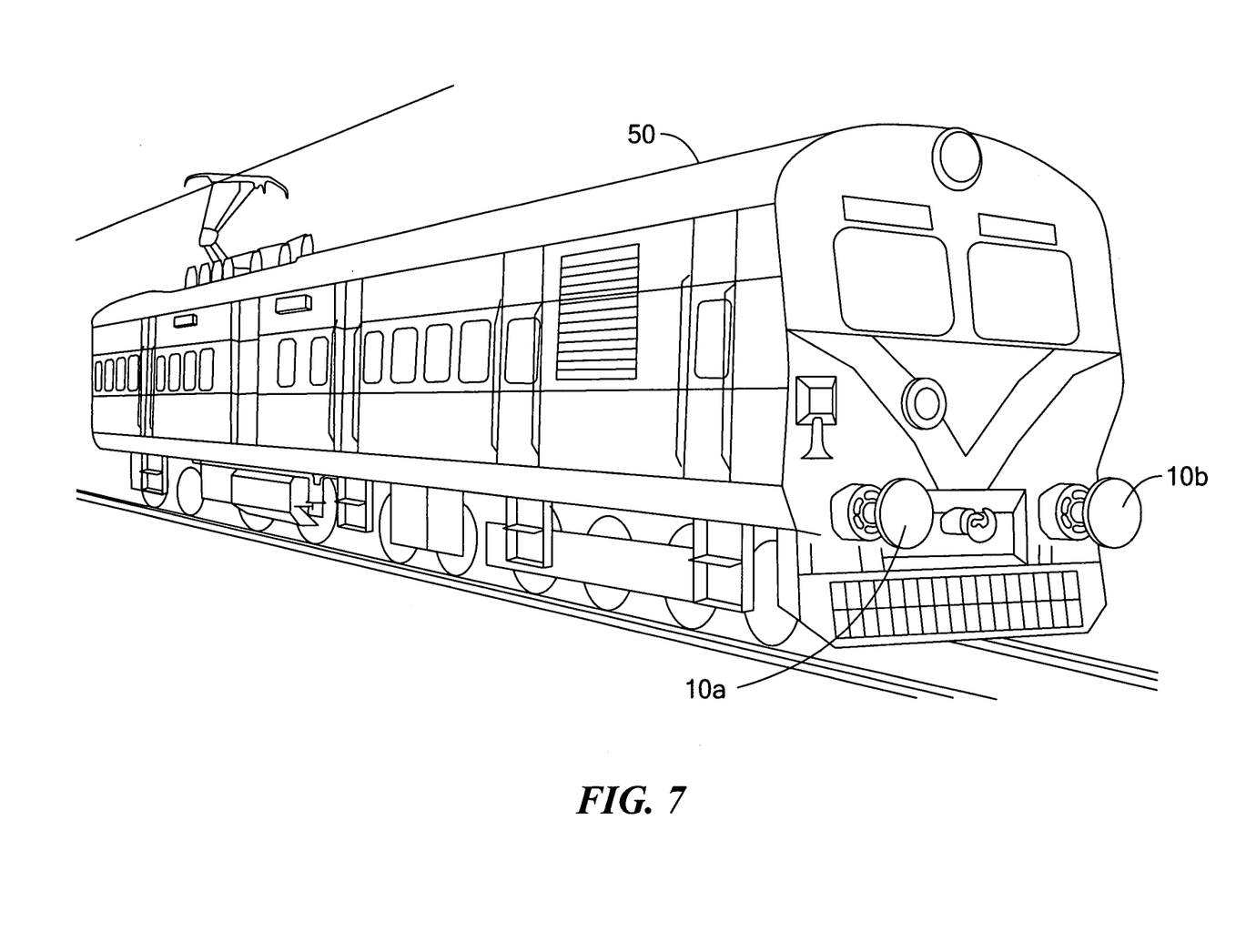
FIG. 7 is a schematic three-dimensional view showing an example of two shock energy absorbers mounted to a locomotive.

FIG. 7 shows two larger shock absorbers 10a and 10b of the type depicted in FIGS. 1 and 2 attached to locomotive 50. Other uses for the shock absorber include end of rail track buffers, crash energy absorbers at the bottom of elevator shafts, use in rail tank cars to prevent puncture of a tank in the event of a collision and/or derailment, shock absorbers used in conjunction with road tankers and hazmat carrying trucks, and chassis front end shock absorbers of automobiles and transit buses. In all examples, a significant amount of energy is absorbed due to the transition of the damping material from a solid to a viscous fluid.

In general, vessel 12 and/or plunger 32 is fixed to a structure. The plunger is driven into the damping material by moving the plunger and the shock absorber to strike an object or by moving an object to strike the structure and the shock absorber. When this occurs, the damping material changes from a solid state to a viscous fluid state and absorbs the energy associated with the impact. Alternatively, a shock absorber can be mounted between two objects or structures.

Figure 8:
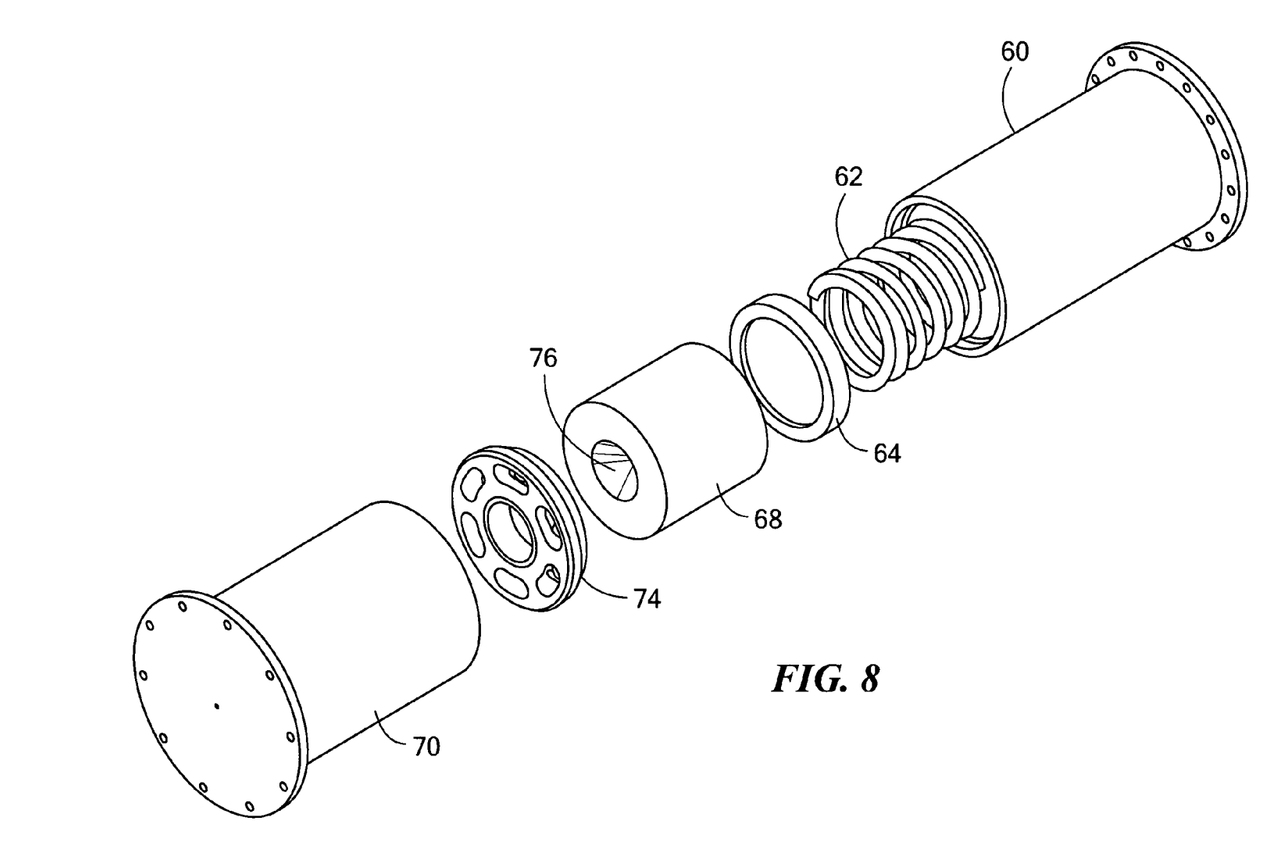
FIG. 8 is an exploded three-dimensional view showing another example of a shock energy absorber system in accordance with an example of the invention.
Figure 9:
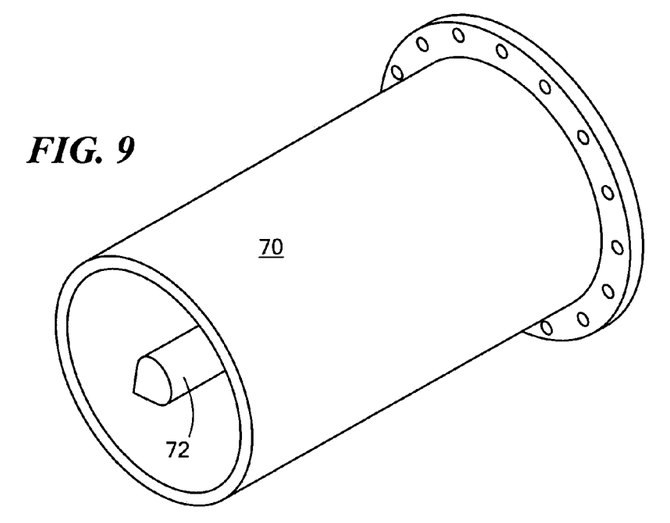
FIG. 9 is a schematic three-dimensional view showing the interior of the plunger assembly of FIG. 8.
Figure 10:
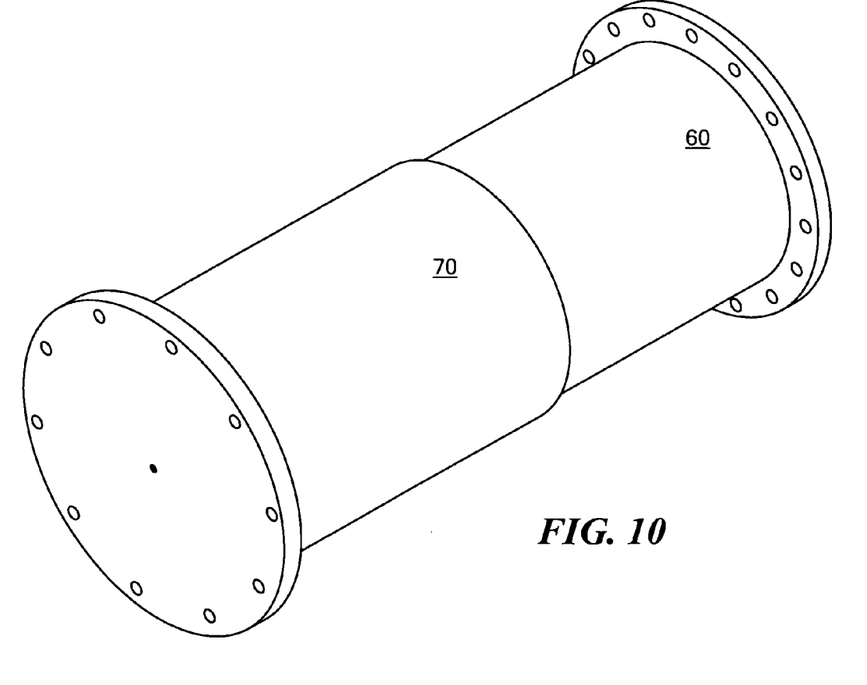
FIG. 10 is a schematic three-dimensional view showing the shock absorber of FIG. 8 in its assembled state.

FIG. 8 shows another design including cylinder 60 housing spring 62, buffer plate 64, and damping material 68 therein. Plunger assembly 70, also shown in FIG. 9, includes plunger 72 positioned to be driven into damping material 68 via bearing sleeve assembly 74, FIG. 8. Again, damping material 68 may include seat 76. FIG. 10 shows the assembled shock energy absorber unit where plunger assembly 70 is coupled over cylinder 60 and plunger 72, FIG. 9 now abuts damping material 68, FIG. 8.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A crash energy absorber comprising:
a solid polymer plastic ultrahigh molecular weight damping material body having an external seat surface and having a critical stress magnitude which varies as crash velocity increases and an ultrahigh molecular weight;
a vessel configured to confine the solid polymer plastic ultrahigh molecular weight damping material body;
a plunger shaft having a distal end disposed at the seat surface of the solid polymer plastic ultrahigh molecular weight damping material body; and
the plunger shaft having a cross sectional area and length relative to the vessel and the solid polymer plastic ultrahigh molecular weight damping material body so configured for the plunger to press on the solid polymer plastic ultrahigh molecular weight damping material body seat surface in response to impact energy until said critical stress magnitude of the solid polymer plastic ultrahigh molecular weight damping material body is reached based on the plunger cross sectional area and velocity causing a phase change in the solid polymer plastic ultrahigh molecular weight damping material body to a liquid state ahead of and adjacent the plunger shaft displacing the plunger shaft into the solid polymer plastic ultrahigh molecular weight damping material body until a stroke of the plunger shaft travel is reached or said impact energy is absorbed causing the solid polymer plastic ultrahigh molecular weight damping material body to undergo a phase change back to a solid adjacent the plunger shaft locking said plunger shaft within the solid polymer plastic ultrahigh molecular weight damping material body.

2. The crash energy absorber of claim 1 in which the distal end of said plunger shaft is conical and the seat surface of the solid polymer plastic ultrahigh molecular weight damping material body has a concave portion receiving the conical distal end of the plunger shaft therein.

3. The crash energy absorber of claim 1 in which the vessel has an open end proximate said seat surface and a distal closed end.

4. The crash energy absorber of claim 3 further including a flange at the closed end of the vessel.

5. The crash energy absorber of claim 3 further including a sleeve fixed about the open end of the vessel and surrounding the plunger shaft.

6. The crash energy absorber of claim 5 in which the sleeve includes a bearing about the plunger shaft.

7. The crash energy absorber of claim 3 in which the damping material radially fills the vessel.

8. The crash energy absorber of claim 1 in which the plunger includes a hollow portion.

9. The shock energy absorber of claim 1 in which the plunger includes a flange attached to the shaft opposite the distal end.

10. The shock energy absorber of claim 1 in which the solid polymer plastic ultrahigh molecular weight damping material is ultrahigh molecular weight polyethylene.

11. The shock energy absorber of claim 1 in which the critical stress magnitude of the damping material body is greater than 25 ksi.

12. The shock energy absorber of claim 1 in which said impact energy is 82,260 ft-lb or greater.

13. A crash energy absorption method comprising:
confining a solid polymer plastic ultrahigh molecular weight damping material body having an external seat surface and having a critical stress magnitude which varies as crash velocity increases and an ultrahigh molecular weight;
disposing a plunger shaft having a distal end located at the seat surface of the solid polymer plastic ultrahigh molecular weight damping material body; and
impacting the plunger shaft at a velocity to press on the solid polymer plastic ultrahigh molecular weight damping material body seat surface until said critical stress magnitude of the solid polymer plastic ultrahigh molecular weight damping material body is reached based on the plunger cross sectional area and velocity causing a phase change in the solid polymer plastic ultrahigh molecular weight damping material body to a liquid state ahead of and adjacent the plunger shaft displacing the plunger shaft into the solid polymer plastic ultrahigh molecular weight damping material body until a stroke of the plunger shaft travel is reached or impact energy is absorbed causing the solid polymer plastic ultrahigh molecular weight damping material body to undergo a phase change back to a solid adjacent the plunger shaft locking said plunger shaft within the solid polymer plastic ultrahigh molecular weight damping material body.

14. The method of claim 13 in which the distal end of said plunger shaft is conical and the seat surface of the solid polymer plastic ultrahigh molecular weight damping material body has a concave portion receiving the conical distal end of the plunger shaft therein.

15. The method of claim 13 in which confining includes disposing the solid plastic ultrahigh molecular weight damping material in a vessel with an open end proximate said seat surface and a distal closed end.

16. The method of claim 15 further including disposing a flange at the closed end of the vessel.

17. The method of claim 15 further including adding a sleeve fixed about the open end of the vessel and surrounding the plunger shaft.

18. The method of claim 17 in which the sleeve includes a bearing about the plunger shaft.

19. The method of claim 15 in which the damping material radially fills the vessel.

20. The method of claim 13 further including hollowing out a portion of the plunger.

21. The method of claim 13 further including adding a flange to the shaft opposite the distal end.

22. The method of claim 13 in which the solid polymer plastic ultrahigh molecular weight damping material is ultrahigh molecular weight polyethylene.

23. The method of claim 13 in which the critical stress magnitude of the damping material is greater than 25 ksi.

24. The method of claim 13 in which said impact energy is 82,260 ft-lb or greater.

* * * * *